United States Patent
Dejaiffe et al.

(10) Patent No.: US 6,562,245 B2
(45) Date of Patent: May 13, 2003

(54) CRUSHED FOAM GLASS FILTER AID AND METHOD OF USE

(75) Inventors: Robert Dejaiffe, Kennewick, WA (US); Jeffrey E. Surma, Richland, WA (US)

(73) Assignee: Integrated Environmental Technologies, LLC, Richland, WA (US)

( * ) Notice: Subject to any disclaimer, the term of this patent is extended or adjusted under 35 U.S.C. 154(b) by 0 days.

(21) Appl. No.: 09/777,802

(22) Filed: Feb. 5, 2001

(65) Prior Publication Data

US 2002/0104810 A1 Aug. 8, 2002

(51) Int. Cl.$^7$ ................................................ B01D 37/02
(52) U.S. Cl. ........................ 210/769; 210/777; 210/791; 210/193
(58) Field of Search ................................ 210/777, 778, 210/193, 768, 769, 791

(56) References Cited

U.S. PATENT DOCUMENTS 5,776,353 A * 7/1998 Palm et al. .................. 210/777
5,908,561 A * 6/1999 Palm et al. .................. 210/777

OTHER PUBLICATIONS

Grant and Hackh's Chemical Dictionary p. 433; Defenition of "Perlife"1987.*

* cited by examiner

*Primary Examiner*—Robert J. Popovics
(74) *Attorney, Agent, or Firm*—Douglas E. McKinley

(57) ABSTRACT

Disclosed is filter aid formed of a crushed foam glass utilized as a filtering aid for removing suspended materials in a fluid stream by first providing a permeable support with the crushed foam glass filter aid placed adjacent thereto, and directing the fluid stream having suspended materials through the filter. Suspended materials within the fluid stream are captured on the crushed foam glass filter aid, separating the suspended materials from the fluid stream. The foam glass filter aid and the suspended materials may then be removed as a mixture, melted to form a molten glass, fritted to form a frit, comminuted to form a foam glass precursor, mixed with precursor with a foaming agent and heated and crushed to reform the foam glass filter aid. Suspended materials captured on the crushed foam glass filter aid are thus removed from the foam glass filter aid, and the foam glass filter aid to be recycled and used again in the filtering process.

4 Claims, No Drawings

CRUSHED FOAM GLASS FILTER AID AND METHOD OF USE

FIELD OF THE INVENTION

The present invention relates generally to a crushed foam glass filter aid and methods for its use.

BACKGROUND OF THE INVENTION

In a great many industrial processes a variety of filtering methods are utilized to separate one substance from another. In many of these processes a filtering aid is placed in a process stream to remove a waste product. Typically the filtering aid, such as diatomaceous earth, is placed adjacent to a permeable barrier, such as a screen. A process stream consisting of a fluid having impurities suspended therein is then directed through the filtering aid and the permeable barrier, whereupon the impurities become trapped on the filtering aid. As will be recognized by those having skill in the art, impurities may be trapped "on" or "within" the filter aid, and as used herein "on" should be understood to include any circumstance whereby impurities are so trapped by the filter aid. The impurities trapped within the filtering aid, together with the filtering aid itself, typically are then removed from the process together as waste.

These types of processes impose costs and inefficiencies on the over all process in at least two ways. First, the filtering aid is typically disposed of with the waste, resulting in an overall increase in waste volume and thus waste disposal costs. Second, a new filtering aid is then required for further filtering, imposing a recurring cost on the process each time filtering aid becomes loaded to capacity with waste.

Thus, there exists a need for improved filtering aids and methods of utilizing such filtering aids that minimize waste generation and disposal costs.

SUMMARY OF THE INVENTION

Accordingly, the present invention is a filter aid formed of a crushed foam glass. Any of the known methods for forming foam glass are suitable for the practice of the present invention, including but not limited to those described in U.S. Pat. No. 3,261,894 "Method of Manufacturing Foamed Silicate Structures" to Alois Seidl, U.S. Pat. No. 3,663,249 "Method for Insolubilizing Sodium Silicate Foam" to Ramesh P. Rao, U.S. Pat. No. 3,743,601 "Process for Making Silicate Foams from Alkali Metal Silicates" to Ramesh P. Rao, U.S. Pat. No. 3,756,839 "Method for Improving the Cellular Structure of Rigid Low Density Silicate Foams" to Ramesh P. Rao, U.S. Pat. No. 3,867,157 "Process for Manufacturing Granular Foamed Products of Silica" to Fukumoto et al. U.S. Pat. No. 3,870,496 "Method of Creating a Foamed Glass Product from Waste Glass" to Ivan B. Cutler, U.S. Pat. No. 3,877,954 "Porous Mouldings" to Bemd Wuistefeld, U.S. Pat. No. 3,951,632, "Method for Manufacture of Foam Glass" to Seki et al., U.S. Pat. No. 4,080,187 "Formation of Foamed Silicate Articles" to Donald R. Parnell, U.S. Pat. No. 4,124,365 "Method for Making Continuous Foam Glass Product" to Williams et al., U.S. Pat. No. 4,347,326 "Foamable Glass Composition and Glass Foam" to Iwami et al., U.S. Pat. No. 4,395,456 "Inorganic Foam" to Jackson et al., US. Patent "Method of Making Foam Glass from Diatomaceous Earth and Fly Ash" to Hojaji et al., the entire contents of each of which are herein incorporated by this reference. Foamed glass formed by any of the known methods are then crushed to particles, again by any method known to those having skill in the art, including, but not limited to hammer milling, jet milling, and jaw crushing. The thus formed crushed foam glass may then utilized as a filtering aid for removing suspended materials in a fluid stream by first providing a permeable support with the crushed foam glass filter aid placed adjacent thereto, and directing the fluid stream having suspended materials through the filter. In this manner, suspended materials within the fluid stream are captured on the crushed foam glass filter aid, separating the suspended materials from the fluid stream. Additional benefits of the present invention may then be realized by removing the foam glass filter aid and the suspended materials as a mixture, melting the mixture to form a molten glass, fritting the molten glass to form a frit, comminuting the frit to form a foam glass precursor, mixing the foam glass precursor with a foaming agent, heating the foam glass precursor and the foaming agent to form a foam glass, and crushing the foam glass to reform the foam glass filter aid. This allows the suspended materials captured on the crushed foam glass filter aid to be removed from the foam glass filter aid, and the foam glass filter aid to be recycled and used again in the filtering process. Preferably, the step of melting the mixture to form a molten glass is performed in a high temperature waste treatment system capable of capturing inorganic portions of the suspended materials (such as metals) in a form which allows them to be separated and recycled, and capable of converting the organic portions of the suspended materials into gasses, which may then be further formed, for example through gas phase chemistry, into useful products such as synthesis gas. In this manner, the filtering aids and the suspended particles are converted to useful products, and/or recycled for further use.

DESCRIPTION OF THE PREFERRED EMBODIMENT(S)

In a preferred embodiment of the present invention, the crushed foam glass utilized exhibits an average size of less than 325 mesh, is formed of foam glass having closed cells of less than 5 microns in diameter, and is formed of recycled waste glass. Crushed foam glass having an average size of less than 325 mesh and formed of foam glass having closed cells of less than 5 microns in diameter allow the removal of very fine suspended materials within the fluid stream without rapidly clogging. Preferably the recycled waste glass is soda lime glass as large quantities of waste soda lime glass are available, and their use in the present invention allows these waste materials to be put to a productive and beneficial use. It is further preferred that the step of the step of melting the mixture to form a molten glass is performed in a high temperature waste treatment system such as a Plasma Enhanced Melter, (PEM™) manufactured by Integrated Environmental Technologies, LLC, of Richland Wash. PEM™ systems have demonstrated the desired capability of separated inorganic materials (such as metals) in a form which allows them to be and recycled, and converting the organic portions into synthesis gas. The general arrangement and operation of PEM™ systems are described in U.S. Pat. No. 5,666,891 Arc Plasma-Melter Electro Conversion System for Waste Treatment and Resource Recovery Issued Sep. 16, 1997, U.S. Pat. No. 5,707,508 Apparatus and Method for Oxidizing Organic Materials Issued Jan. 13, 1998, U.S. Pat. No. 5,756,957 Tunable Molten Oxide Pool Assisted Plasma Melter Vitrification System Issued May 26, 1998, U.S. Pat. No. 5,785,923 Apparatus for Continuous Feed Material Melting Issued Jul. 28, 1998, U.S. Pat. No. 5,798,497 Tunable, Self-Powered Integrated Arc Plasma- Melter Vitrification System for Waste Treatment and Resource Recovery Issued Aug. 25, 1998, U.S. Pat. No. 5,811,752 Enhanced Plasma-Melter Vitrification Systems Issued Sep. 22, 1998, U.S. Pat. No. 5,847,353 Methods and Apparatus for Low NoX Emissions During the Production of Electricity from Waste Treatment Systems Issued Dec. 8, 1998, U.S. Pat. No. 5,908,564 Tunable, Self-powered Arc Plasma-melter Electro Conversion System for Waste Treatment and Resource Recovery Issued Jun. 1, 1999, U.S. Pat. No. 6,018,471 Methods and Apparatus For Treating Waste Issued Jan. 25, 2000, and U.S. Pat. No. 6,037,560 Enhanced Plasma-Melter Vitrification Systems Issued Apr. 14, 2000, the entire contents of each of which are incorporated herein by this reference.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A method of filtering suspended materials in a fluid stream comprising the steps of:

a. providing a filter having a permeable support and a crushed foam glass filter aid adjacent thereto;

b. directing said fluid stream through said filter, thereby capturing suspended materials on said crushed foam glass filter aid and separating said suspended materials from said fluid stream, c. removing the suspended foam glass filter aid and the suspended materials as a mixture, d. melting said mixture to form a molten glass, e. fritting said molten glass to form a frit, f. comminuting said frit to form a foam glass precursor, g. mixing said foam glass precursor with a foaming agent, h. heating said foam glass precursor and said foaming agent to form a foam glass, i. crushing said form glass to reform the foam glass filter aid.

2. The method of claim 1 wherein organic materials contained within said suspended materials are reacted to form synthesis gas when said mixture is melted to form the molten glass.

3. The method of claim 1 wherein inorganic materials contained within said suspended materials are incorporated into said molten glass when said mixture is melted to form the molten glass.

4. The method of claim 1 wherein the step of melting the mixture to form the molten glass is performed in a plasma enhanced, joule heated melter.

* * * * *